United States Patent
Jeon

(10) Patent No.: US 11,325,573 B2
(45) Date of Patent: May 10, 2022

(54) REAR WHEEL REGENERATIVE BRAKING CONTROL SYSTEM FOR VEHICLE AND METHOD THEREFOR

(71) Applicants: Hyundai Motor Company, Seoul (KR); Kia Motors Corporation, Seoul (KR)

(72) Inventor: Gab Bae Jeon, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/717,674

(22) Filed: Sep. 27, 2017

(65) Prior Publication Data

US 2018/0244249 A1    Aug. 30, 2018

(30) Foreign Application Priority Data

Feb. 24, 2017    (KR) ........................ 10-2017-0024653

(51) Int. Cl.
     *B60T 8/17*      (2006.01)
     *B60T 8/1761*      (2006.01)
     (Continued)

(52) U.S. Cl.
     CPC ............ *B60T 8/17616* (2013.01); *B60L 7/18* (2013.01); *B60L 7/26* (2013.01); *B60T 8/1725* (2013.01);
     (Continued)

(58) Field of Classification Search
     CPC ... B60T 8/17; B60T 8/26; B60T 8/265; B60T 8/266; B60T 8/267; B60T 8/268; B60T 8/28; B60T 8/32; B60T 8/321; B60T 8/3245; B60T 8/17616; B60T 8/1763; B60T 8/17633; B60T 8/1766; B60T 8/1812; B60T 2270/00; B60T 2270/10; B60T 2270/206; B60T 2270/211; B60T 2270/60; B60T 2270/602; B60T 2270/603; B60T 2270/604; B60T 2270/82; B60L 7/20; B60L 7/24; B60L 7/26; B60L 7/00; B60L 7/08; B60L 7/06; B60L 7/18; B60L 3/00; B60L 3/10; B60L 3/106; B60L 3/108; B60L 2240/00;
(Continued)

(56) References Cited

U.S. PATENT DOCUMENTS 6,099,089 A * 8/2000 Schneider ............... B60L 3/102
                                                                   303/152
6,107,761 A * 8/2000 Seto ..................... B60L 15/2009
                                                                  318/139

(Continued)

FOREIGN PATENT DOCUMENTS

| AU | 2010347249 A1 | 9/2012 |
| EP | 2 626 259 A1 | 6/2013 |

(Continued)

*Primary Examiner* — Richard A Goldman
(74) *Attorney, Agent, or Firm* — Morgan, Lewis & Bockius LLP

(57) ABSTRACT

A rear wheel regenerative braking control system for vehicle, may include a brake controller; a vehicle controller; a hydraulic controller; and a motor controller, wherein the system and the method may maximize an amount of rear wheel regenerative braking while easily securing braking stability of a vehicle.

9 Claims, 6 Drawing Sheets

(51) Int. Cl.
  *B60T 8/1766* (2006.01)
  *B60L 7/18* (2006.01)
  *B60L 7/26* (2006.01)
  *B60T 8/172* (2006.01)
  *B60T 8/1755* (2006.01)
  *B60T 8/50* (2006.01)
  *B60T 8/26* (2006.01)

(52) U.S. Cl.
  CPC .......... *B60T 8/1755* (2013.01); *B60T 8/1766* (2013.01); *B60T 8/50* (2013.01); *B60L 2240/22* (2013.01); *B60L 2240/461* (2013.01); *B60L 2250/26* (2013.01); *B60T 8/267* (2013.01); *B60T 2240/03* (2013.01); *B60T 2250/03* (2013.01); *B60T 2270/10* (2013.01); *B60T 2270/30* (2013.01); *B60T 2270/602* (2013.01); *B60T 2270/608* (2013.01); *Y02T 10/72* (2013.01)

(58) Field of Classification Search
  CPC ............. B60L 2240/10; B60L 2240/16; B60L 2240/22; B60L 2240/40; B60L 2240/42; B60L 2240/421; B60L 2240/423; B60L 2240/46; B60L 2240/465; B60W 10/08; B60W 10/18; B60W 10/184; B60W 10/188; B60W 10/192; B60W 30/02; B60W 30/18172; Y02T 10/7258
  USPC ........ 701/70, 71, 72, 73, 74, 75, 78, 82, 83; 188/158; 180/179, 343; 318/376, 432
  See application file for complete search history.

(56) References Cited

U.S. PATENT DOCUMENTS

| | | | |
|---|---|---|---|
| 6,179,395 B1 * | 1/2001 | Schneider | B60L 15/2009 303/152 |
| 6,231,134 B1 | 5/2001 | Fukasawa et al. | |
| 6,325,470 B1 * | 12/2001 | Schneider | B60K 1/00 303/152 |
| 9,150,109 B2 * | 10/2015 | Ajiro | B60W 30/18172 |
| 9,266,511 B2 * | 2/2016 | Pihl | B60T 8/1766 |
| 9,296,376 B2 * | 3/2016 | Nishio | B60L 50/16 |
| 9,333,962 B2 * | 5/2016 | Kim | B60T 8/885 |
| 9,878,621 B2 * | 1/2018 | McCormick | B60T 1/10 |
| 2002/0163250 A1 * | 11/2002 | Huls | B60L 7/18 303/152 |
| 2006/0196712 A1 * | 9/2006 | Toyota | B60K 6/445 180/165 |
| 2007/0046099 A1 * | 3/2007 | Matsuura | B60W 10/184 303/152 |
| 2010/0198475 A1 * | 8/2010 | Stolzl | B60L 7/18 701/74 |
| 2012/0133202 A1 * | 5/2012 | Mui | B60L 3/10 303/152 |
| 2012/0138375 A1 * | 6/2012 | Hughes | B60L 7/10 180/65.1 |
| 2012/0203416 A1 * | 8/2012 | Yoshimura | B60K 6/445 701/22 |
| 2012/0325573 A1 * | 12/2012 | Miller | B60L 7/24 180/282 |
| 2013/0076113 A1 | 3/2013 | Pihl et al. | |
| 2014/0195133 A1 * | 7/2014 | Kato | B60W 20/00 701/78 |
| 2018/0244249 A1 * | 8/2018 | Jeon | B60T 8/1755 |
| 2020/0017082 A1 * | 1/2020 | Takahashi | B60T 13/662 |
| 2020/0180577 A1 * | 6/2020 | Buell | F16D 61/00 |

FOREIGN PATENT DOCUMENTS

| | | |
|---|---|---|
| JP | 2002058107 A | 2/2002 |
| JP | 2009-278840 A | 11/2009 |
| JP | 2014108745 A | 6/2014 |
| JP | 2015085792 A | 5/2015 |
| JP | 2015-201913 A | 11/2015 |
| KR | 20080053972 A | 6/2008 |
| KR | 10-2015-0091244 A | 8/2015 |

* cited by examiner

REAR WHEEL REGENERATIVE BRAKING CONTROL SYSTEM FOR VEHICLE AND METHOD THEREFOR

CROSS REFERENCE TO RELATED APPLICATION

The present application claims priority to Korean Patent Application No. 10-2017-0024653, filed Feb. 24, 2017, the entire content of which is incorporated herein for all purposes by this reference.

BACKGROUND OF THE INVENTION

Field of the Invention

The present invention relates to a rear wheel regenerative braking control system for vehicle and method therefor. More particularly, the present invention relates to a rear wheel regenerative braking control system for vehicle and method therefor, the system and method being configured for maximizing an amount of vehicle-rear wheel regenerative braking while easily securing braking stability of a vehicle.

Description of Related Art

Eco-friendly vehicles including electric vehicles, fuel cell vehicles, as well as hybrid vehicles employ regenerative braking to convert a portion of braking force to electrical energy and charge a battery with the electrical energy, wherein a driving motor is used as a generator during a braking operation.

Generally, when power of a driving motor is transmitted to front wheels, front wheel regenerative braking is performed, and when power of a driving motor is transmitted to rear wheels, rear wheel regenerative braking is performed. Here, total braking force is obtained by the sum of regenerative braking force and hydraulic braking force.

Referring to FIG. 1, in control of the distribution of braking force including the rear wheel regenerative braking, to increase the recovery of electrical energy from the total braking force, the rear-wheel regenerative braking force is first distributed as much as possible, and the remaining braking force is distributed from front-wheel and rear-wheel hydraulic braking forces.

In such braking force distribution control, as shown in FIG. 1, while a rear-wheel regeneration braking force can be maximally distributed in a lower deceleration region, which is mainly used during actual road driving, in the instant case, the amount of the distribution of the rear-wheel braking force becomes much greater than that of front-wheel braking force, possibly resulting in faster locking of the rear wheels. Such faster locking of the rear wheels problematically causes a reduction in vehicle braking stability and the occurrence of vehicle spinning.

In contrast, as shown in FIG. 2, when in the lower deceleration region, the rear-wheel regenerative braking force is distributed to a predetermined level or less while hydraulic braking force is more distributed than the rear-wheel regenerative braking force, the braking stability of a vehicle can be secured, but the recovery of electrical energy from the rear-wheel regenerative braking force is degraded, causing a reduction in an effect of increasing fuel efficiency.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a rear wheel regenerative braking control system for vehicle and method therefor, the system and method being configured for, in control of the distribution of braking force of a vehicle, maximizing an amount of rear wheel regenerative braking to obtain an improvement in fuel efficiency, while easily securing braking stability of a vehicle.

Various aspects of the present invention are directed to providing a rear wheel regenerative braking control system for a vehicle, the system including: a brake controller; a vehicle controller; a hydraulic controller; and a motor controller, wherein the brake controller is configured to determine and transmit an allowable rear-wheel regenerative braking performance value to the vehicle controller and to determine a target hydraulic braking performance value based on an actual rear-wheel regenerative braking performance value received from the vehicle controller and transmit the target hydraulic braking performance value to the hydraulic controller; the vehicle controller configured to determine a rear-wheel regenerative braking performance command value based on the allowable rear-wheel regenerative braking performance value received from the brake controller and transmit the rear-wheel regenerative braking performance command value to the motor controller and to transmit the actual rear-wheel regenerative braking performance value received from the motor controller to the brake controller; the hydraulic controller is configured to apply a hydraulic braking force to a hydraulic brake based on the target hydraulic braking performance value received from the brake controller; and the motor controller is configured to control a motor to generate a rear-wheel regenerative braking operation according to the rear-wheel regenerative braking performance command value received from the vehicle controller, and wherein the brake controller is configured to determine a wheel slip rate based on a detection signal from a wheel-speed detector and, when the wheel slip rate is determined to maintain a predetermined level or more for a predetermined duration time or more, to transmit a rear-wheel regenerative braking-interruption signal to the vehicle controller, and the vehicle controller is configured to reset a rear-wheel regenerative braking performance command value according to the rear-wheel regenerative braking-interruption signal to a value smaller than a current rear-wheel regenerative braking performance value and transmit the reset value to the motor controller.

Various aspects of the present invention are directed to providing a rear wheel regenerative braking control method for a vehicle, the method including a step of: by a brake controller, determining and transmitting an allowable rear-wheel regenerative braking performance value to a vehicle controller and determining a target hydraulic braking performance value based on an actual rear-wheel regenerative braking performance value received from the vehicle controller and transmitting the target hydraulic braking performance value to a hydraulic controller; a step of, by the vehicle controller, determining a rear-wheel regenerative braking performance command value based on the allowable rear-wheel regenerative braking performance value received from the brake controller and transmitting the rear-wheel regenerative braking performance command value to a motor controller, and transmitting the actual rear-wheel regenerative braking performance value received from the motor controller to the brake controller; a step of, by the hydraulic controller, applying a hydraulic braking force to a hydraulic brake based on the target hydraulic braking performance value received from the brake controller; and a step of, by the motor controller, controlling a motor to generate a rear-wheel regenerative braking operation according to the rear-wheel regenerative braking performance command value received from the vehicle controller, wherein the method further includes steps of: determining, by the brake controller, a wheel slip rate based on a detection signal from a wheel-speed detector and; when the wheel slip rate is determined to maintain a predetermined level or more for a predetermined duration time or more, transmitting a rear-wheel regenerative braking-interruption signal to the vehicle controller, and; by the vehicle controller, resetting a rear-wheel regenerative braking performance command value according to the rear-wheel regenerative braking-interruption signal to a value smaller than a current rear-wheel regenerative braking performance value and; transmitting the reset value to the motor controller.

The present invention produces the following effects accordingly.

First, the rear-wheel regenerative braking is performed before faster locking of rear wheels than front wheels or the occurrence of spinning of the vehicle according to the locking, maximizing the rear-wheel regenerative braking and increasing battery charge of electrical energy, leading to an improvement in fuel efficiency.

Second, the rear-wheel regenerative braking is performed before faster locking of rear wheels than front wheels or the occurrence of spinning according to the locking, preventing a conventional problem of faster locking of rear wheels than front wheels or of the occurrence of spinning of the vehicle, which occurs due to rear-wheel braking force becoming greater than front-wheel braking force, improving braking stability of a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
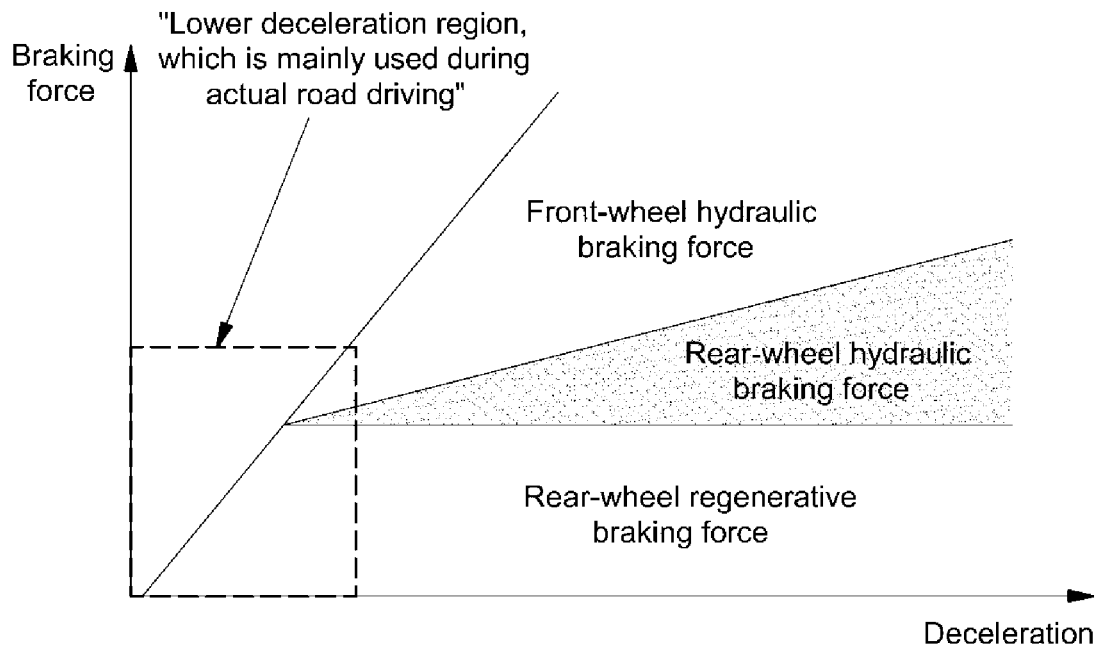
FIG. 1 is a graph illustrating an example of braking force distribution of a rear-wheel regenerative braking vehicle, in which rear-wheel regenerative braking performance is preferentially considered.
Figure 2:
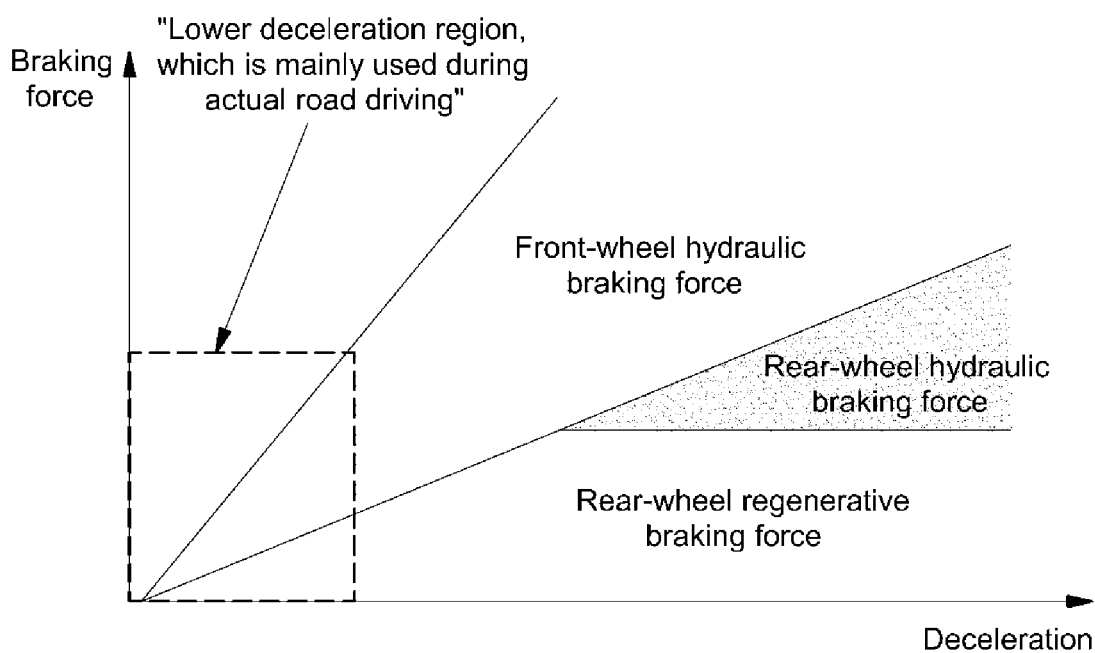
FIG. 2 is a graph illustrating an example of braking force distribution of a rear-wheel regenerative braking vehicle, in which braking stability is preferentially considered.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, exemplary embodiments of the present invention will be described in detail with reference to the accompanying drawings. Throughout the drawings, the same reference numerals will refer to the same or like parts.

Figure 3:
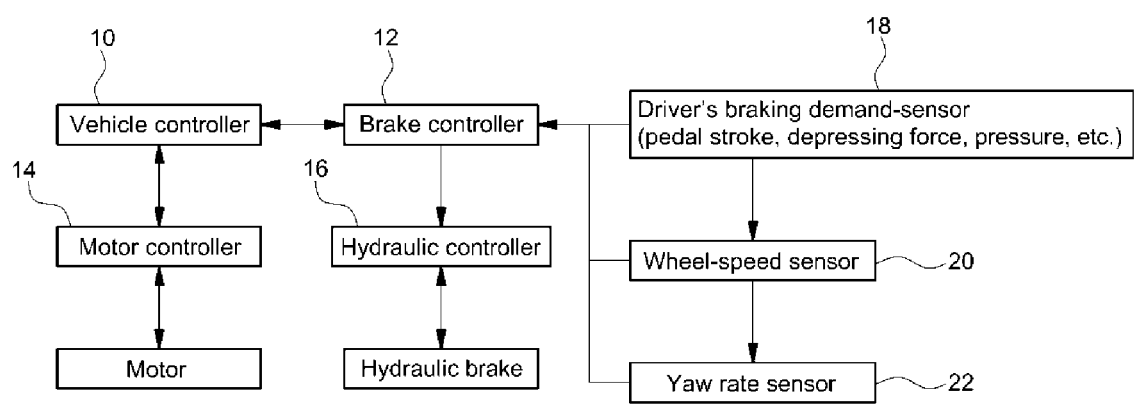
FIG. 3 is a configuration view of a rear wheel regenerative braking control system for a vehicle according to an exemplary embodiment of the present invention.
Figure 4:
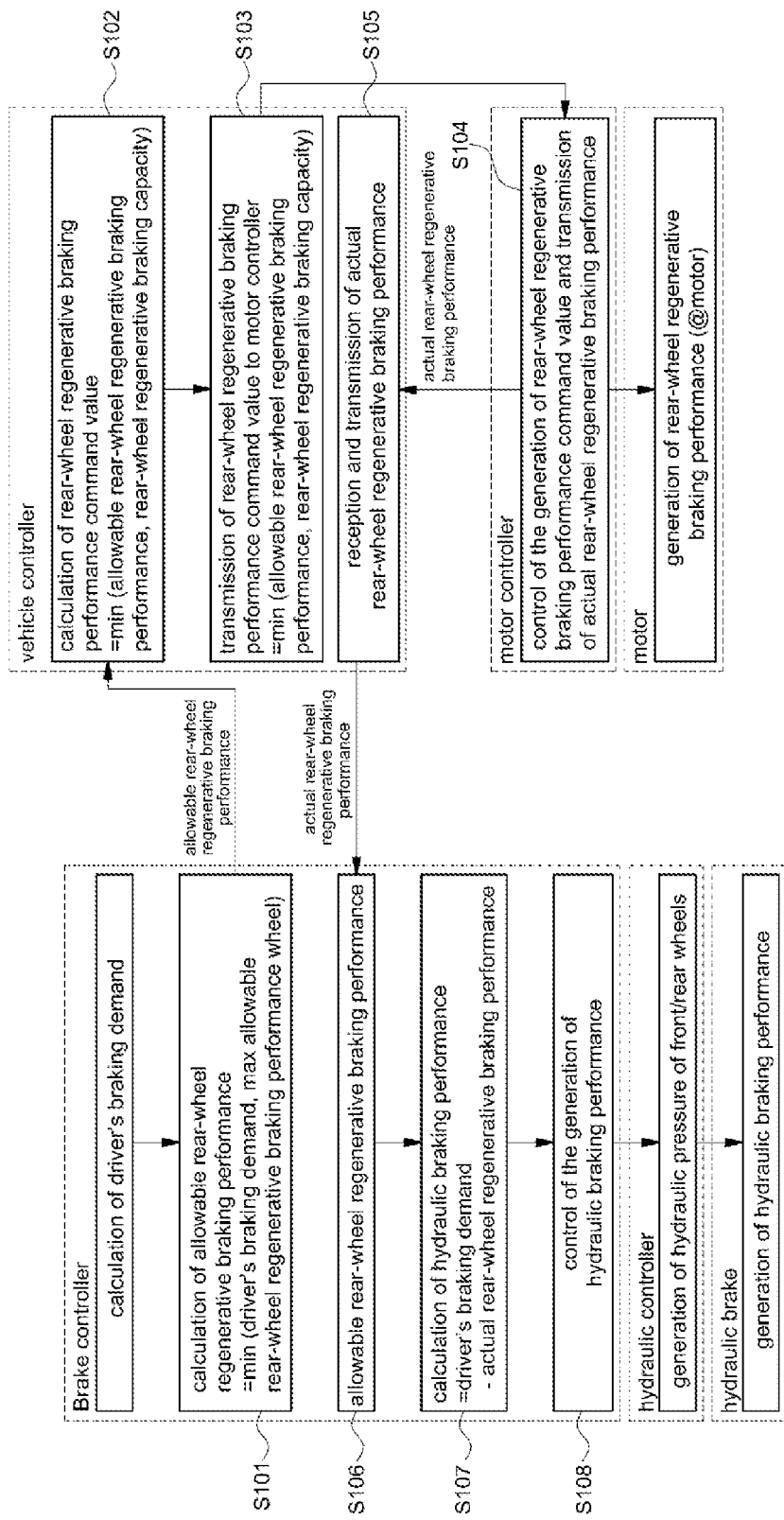
FIG. 4 and FIG. 5 are flow charts illustrating a rear wheel regenerative braking control method for a vehicle according to an exemplary embodiment of the present invention.
Figure 5:
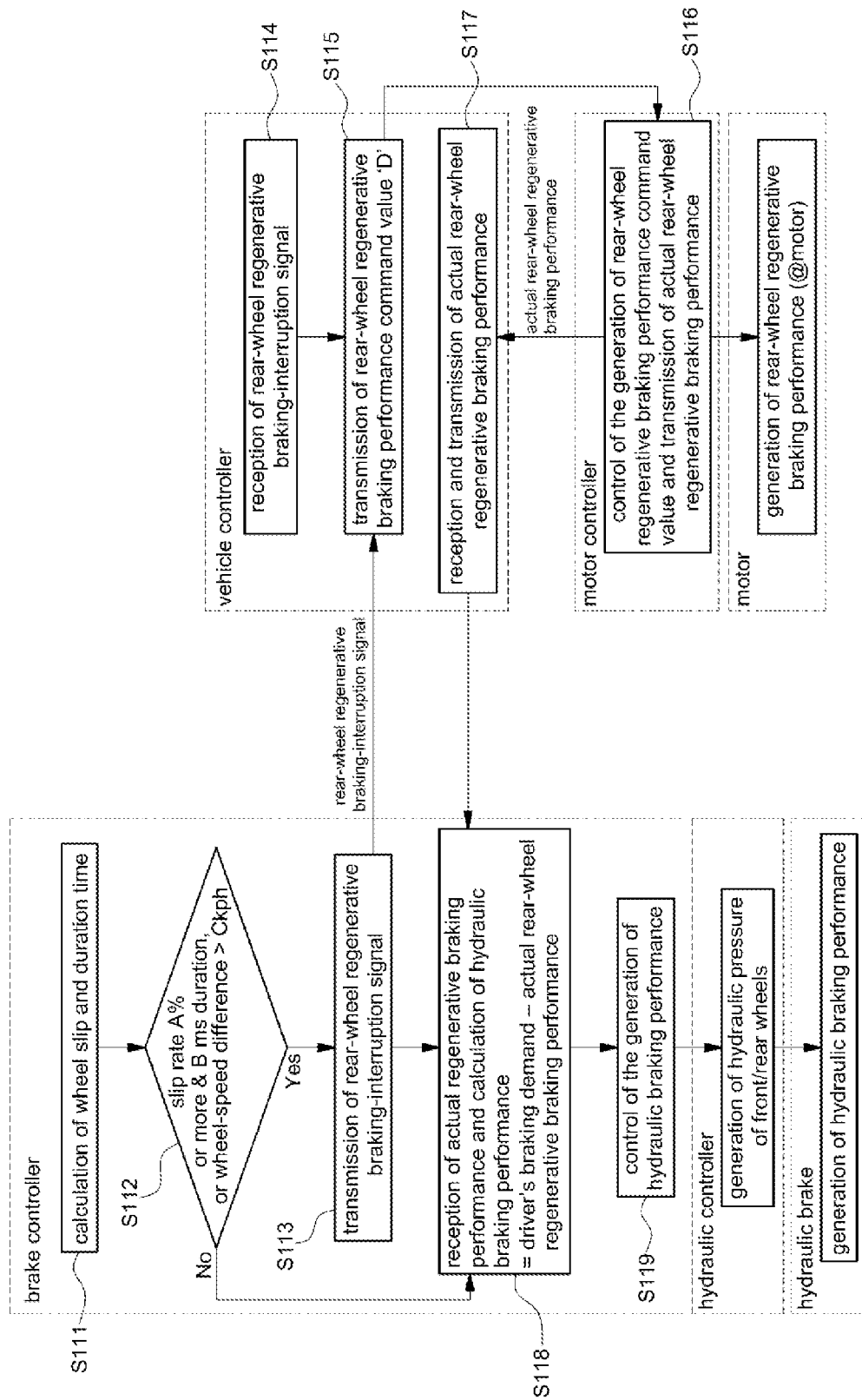
Figure 6:
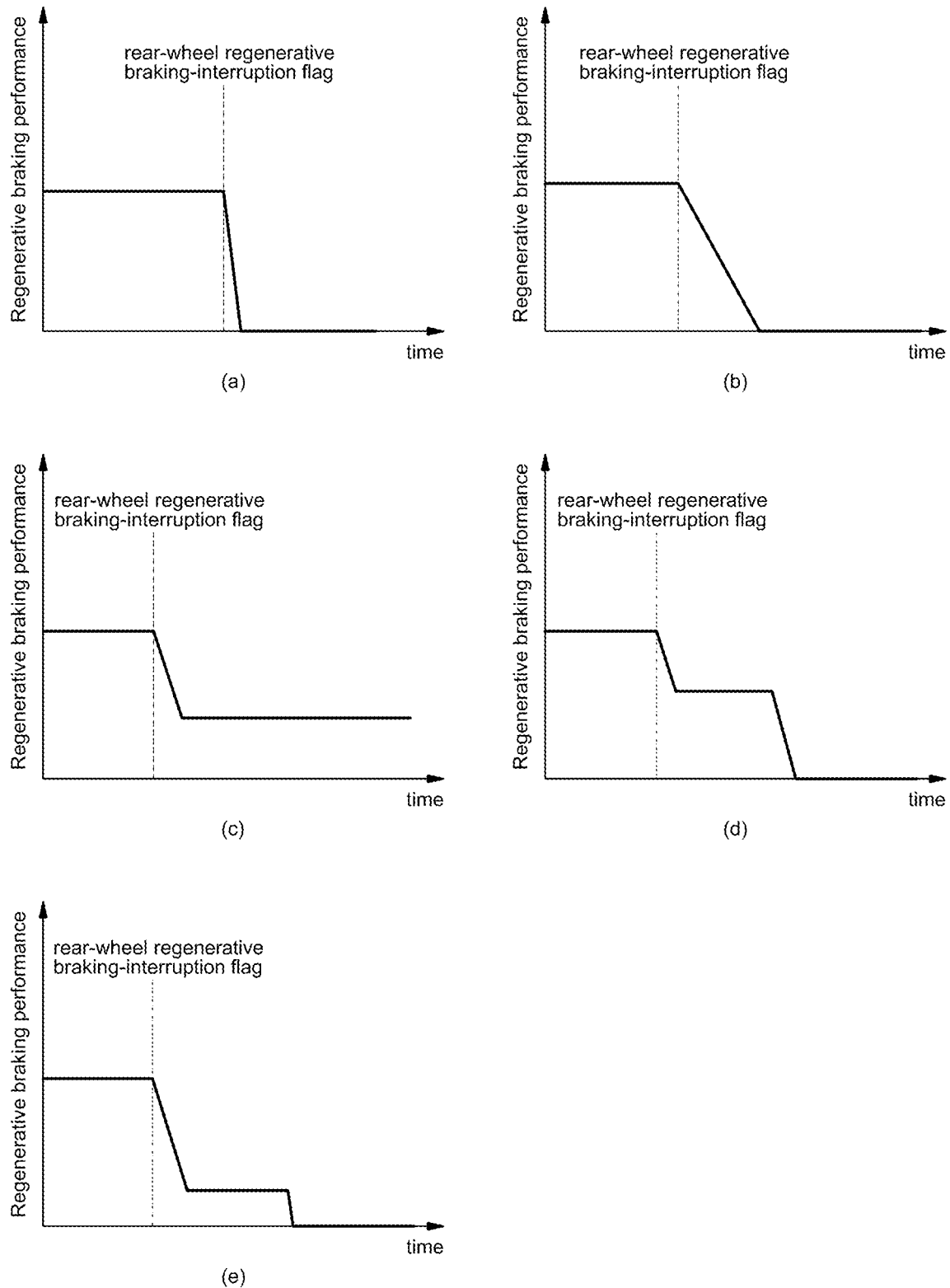
FIG. 6 is a graph illustrating an example of resetting a rear-wheel regenerative braking performance command value according to the rear wheel regenerative braking control method for a vehicle.

FIG. 3 is a configuration view of a rear wheel regenerative braking control system for a vehicle according to an exemplary embodiment of the present invention, FIG. 4 and FIG. 5 are flow charts illustrating a rear wheel regenerative braking control method for a vehicle according to an exemplary embodiment of the present invention, FIG. 6 is a graph illustrating an example of resetting a rear-wheel regenerative braking performance command value according to the rear wheel regenerative braking control method for a vehicle.

In FIG. 3, reference numeral 10 denotes a vehicle controller as a top-level controller of a rear-wheel regenerative braking vehicle.

A brake controller 12 and a motor controller 14 are electrically communicatingly coupled to the vehicle controller 10, and a hydraulic controller 16 is coupled top the brake controller 12 for the control of hydraulic braking.

In addition to a wheel-speed detector 20 and a yaw rate detector 22, a brake pedal detector 18 as a means for detecting a driver's braking demand is communicatingly connected to the brake controller 12.

The brake controller 12 is configured to determine and transmit an allowable rear-wheel regenerative braking performance value to the vehicle controller and determine a target hydraulic braking performance value based on an actual rear-wheel regenerative braking performance value received from the vehicle controller and transmit the target hydraulic braking performance value to the hydraulic controller.

The vehicle controller 10 is configured to determine a rear-wheel regenerative braking performance command value based on the allowable rear-wheel regenerative braking performance value received from the brake controller 12 and transmit the rear-wheel regenerative braking performance command value to the motor controller, and to transmit the actual rear-wheel regenerative braking performance value received from the motor controller to the brake controller.

The hydraulic controller 16 is configured to apply a hydraulic braking force to a hydraulic brake based on the target hydraulic braking performance value received from the brake controller 12.

The motor controller 14 is configured to control a motor to generate a rear-wheel regenerative braking operation according to the rear-wheel regenerative braking performance command value received from the vehicle controller 10.

The brake controller 12 is further configured to transmit a rear-wheel regenerative braking-interruption signal to cope with the occurrence of a phenomenon that rear wheels are locked or a spinning of the vehicle occurs during rear wheel regenerative braking. To the present end, the wheel-speed detector 20 and the yaw rate detector 22 are communicatingly connected to the brake controller 12.

Here, a rear-wheel regenerative braking control method having the above-mentioned configuration is as follows.

First, the brake pedal detector 18 detects a driver's braking demand simultaneously when a driver depresses a brake pedal, and then transmits the detected signal to the brake controller 12. As such, the brake controller 12 determines a demanded braking force and also determines an allowable rear-wheel regenerative braking performance value based on the demanded braking force (S101).

Subsequently, the brake controller 12 transmits the allowable rear-wheel regenerative braking performance value to the vehicle controller 10 as a top-level controller.

Here, the allowable rear-wheel regenerative braking performance value is a value that is predetermined to a lower level than the demanded braking force, and varies according to the demanded braking force.

Subsequently, the vehicle controller 10 determines a rear-wheel regenerative braking performance command value (S102), and transmits the determined command value to the motor controller 14 (S103).

When the vehicle controller 10 determines the rear-wheel regenerative braking performance command value, the rear-wheel regenerative braking performance command value is selected from either one of the allowable rear-wheel regenerative braking performance value received from the brake controller 12 and predetermined rear-wheel regenerative braking capacity that has a value lower than that of the other.

Subsequently, the motor controller 14 controls a motor to generate a rear-wheel regenerative braking operation according to the rear-wheel regenerative braking performance command value received from the vehicle controller 10 (S104) so that a battery is charged with electrical energy obtained according to the generated rear-wheel regenerative braking operation.

Further, the motor controller 14 transmits an actual rear-wheel regenerative braking performance value performed by the motor that is performing the regenerative braking to suit to the rear-wheel regenerative braking performance command value to the vehicle controller 10 (S104).

Subsequently, the vehicle controller 10 transmits the actual rear-wheel regenerative braking performance value received from the motor controller 14 to the brake controller 12 (S105).

Subsequently, the brake controller 12 receives the actual rear-wheel regenerative braking performance value from the vehicle controller 10 (S106), determines a target hydraulic braking performance value based on the received actual rear-wheel regenerative braking performance value (S107), and transmits the determined hydraulic braking performance value to the hydraulic controller 16 (S108).

Here, since the demanded braking force is the sum of the hydraulic braking force and the regenerative braking force (the actual regenerative braking performance value), the hydraulic braking force determined by the brake controller 12 can be obtained by subtracting the actual rear-wheel regenerative braking performance value from the demanded braking force.

Subsequently, the hydraulic controller 16 applies hydraulic braking force to a hydraulic brake based on the hydraulic braking performance value received from the brake controller 12, performing hydraulic braking on wheels.

Like this, vehicle braking is performed by the combination of the hydraulic braking performance value and the actual rear-wheel regenerative braking performance value during the rear-wheel regenerative braking.

In the meantime, there may be a case in which during such rear-wheel regenerative braking, the rear-wheel braking force becomes much greater than the front-wheel braking force so that the real wheels are first locked. Faster locking of the rear wheels than the front wheels may cause degraded braking stability and the occurrence of spinning of the vehicle.

The present invention is, thus, configured such that the rear-wheel regenerative braking is performed before faster locking of the rear wheels than the front wheels or the occurrence of the spinning of the vehicle due to the faster locking, maximizing the rear-wheel regenerative braking and increasing fuel efficiency while easily preventing the faster locking of rear wheels or the occurrence of spinning of the vehicle, leading to improved braking stability.

Thus, a wheel slip rate and a duration time thereof are determined to determine whether or not locking of rear wheels or spinning of the vehicle occurs during rear-wheel regenerative braking (S111).

The brake controller 12 determines a wheel slip rate and a duration time thereof based on a wheel-speed signal received from the wheel-speed detector 20, and determines whether or not the wheel slip rate is maintained at a predetermined level (A %) or more for a predetermined duration time (B ms) or more (S112).

When it is determined that the wheel slip rate is maintained at a predetermined level (A % or more for a predetermined duration time (B ms) or more, the brake controller transmits a rear-wheel regenerative braking-interruption signal to the vehicle controller 10 (S113).

Subsequently, when receiving the rear-wheel regenerative braking-interruption signal from the brake controller 12 (S114), the vehicle controller 10 resets a rear-wheel regenerative braking performance command value (D) according to the rear-wheel regenerative braking-interruption signal to a value smaller than a current rear-wheel regenerative braking performance value and transmits the reset value to the motor controller 14 (S115).

In the meantime, the brake controller 12 may also determine a wheel-speed difference between a front wheel and a rear wheel as a regenerative braking-interruption condition to determine whether or not locking of rear wheels or spinning of the vehicle occurs during rear-wheel regenerative braking. When it is determined that the wheel-speed difference is a predetermined level (C) or more, the brake controller transmits a rear-wheel regenerative braking-interruption signal to the vehicle controller.

Here, in addition to the wheel-speed difference between front and rear wheels, a left and right wheel-speed difference of front and rear wheels, a wheel-speed difference between average front-wheel speed and average rear-wheel speed, or the like may also be used as the regenerative braking-interruption condition to determine whether or not locking of rear wheels or spinning of the vehicle occurs during rear-wheel regenerative braking.

Further, the brake controller 12 may also receive a yaw rate-detection signal from the yaw rate detector 22 as a regenerative braking-interruption condition to determine whether or not locking of rear wheels or wheel spinning occurs during rear-wheel regenerative braking. When it is determined that the yaw rate signal is a predetermined level or more, the brake controller transmits a rear-wheel regenerative braking-interruption signal to the vehicle controller 10.

As described with reference to S115, the vehicle controller 10 resets the rear-wheel regenerative braking performance command value according to the rear-wheel regenerative braking-interruption signal from the brake controller 12 to a value smaller than a current rear-wheel regenerative braking performance value, and transmits the reset value to the motor controller 14.

Here, as shown in FIG. 6, the rear-wheel regenerative braking performance command value (D) transmitted to the motor controller 14 is reset to a value that decreases at a certain slope to a certain level that is lower than the current rear-wheel regenerative braking performance value, that decreases at a certain slope from the current rear-wheel regenerative braking performance value to zero, or that decreases from the current rear-wheel regenerative braking performance value to zero in a stepwise manner.

Subsequently, the motor controller 14 controls a regenerative braking operation of a motor to have an actual rear-wheel regenerative braking performance value to correspond to the reset rear-wheel regenerative braking performance command value (D) (S116), and at the same time, transmits the actual rear-wheel regenerative braking performance value to correspond to the rear-wheel regenerative braking performance command value (D) to the brake controller 12.

Thus, with the control of the regenerative braking of a motor to have a reduced actual rear-wheel regenerative braking performance value to correspond to a reset rear-wheel regenerative braking performance command value (D) so that the rear-wheel regenerative braking of a vehicle is performed before rear wheels are first locked, compared to front wheels, or wheel spinning due to the locking of rear wheels occurs, maximizing rear-wheel regenerative braking and easily preventing faster rear-wheel locking or wheel spinning, leading to improved braking stability.

In the meantime, when the brake controller 12 receives the actual rear-wheel regenerative braking performance value to correspond to the rear-wheel regenerative braking performance command value (D), the brake controller determines a hydraulic braking performance value based on the received actual rear-wheel regenerative braking performance value (S118) and transmits the determined hydraulic braking performance value to the hydraulic controller 16 (S119).

Here, since the demanded braking force is the sum of the hydraulic braking performance value and the regenerative braking performance value (performed to correspond to the rear-wheel regenerative braking performance command value), the hydraulic braking performance value determined by the brake controller 12 may be determined as a value that increases by an amount by which the actual rear-wheel regenerative braking performance value is reduced.

Thus, with the control of the hydraulic controller to increase the hydraulic braking force applied to the hydraulic brake by an amount by which the actual rear-wheel regenerative braking performance value is reduced, the vehicle braking can be performed stably.

As exemplary tests, vehicle-braking stability evaluation tests were performed on a low-friction artificial road with respect to two cases: a first case in which regenerative braking is performed with a rear-wheel regenerative braking performance command value according to a rear-wheel regenerative braking-interruption signal (the present invention); a second case in which regenerative braking is performed with a rear-wheel regenerative braking performance command value without a rear-wheel regenerative braking-interruption signal (conventionally). Test results are shown with graphs of FIG. 7A and FIG. 7B.

Figure 7A:
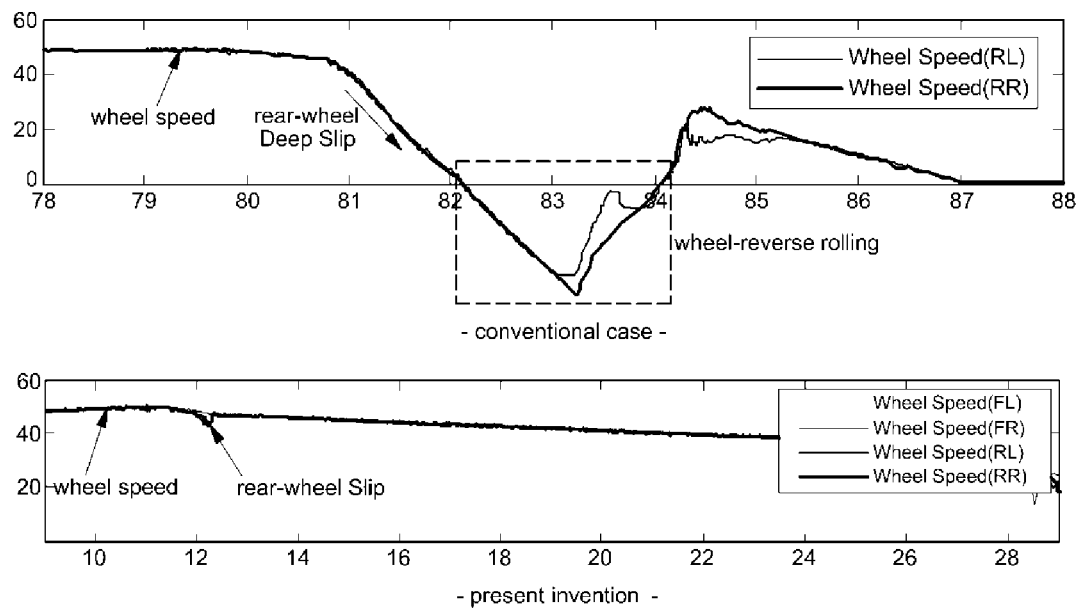
FIG. 7A and FIG. 7B are graphs illustrating test results of the rear wheel regenerative braking control method for a vehicle.
Figure 7B:
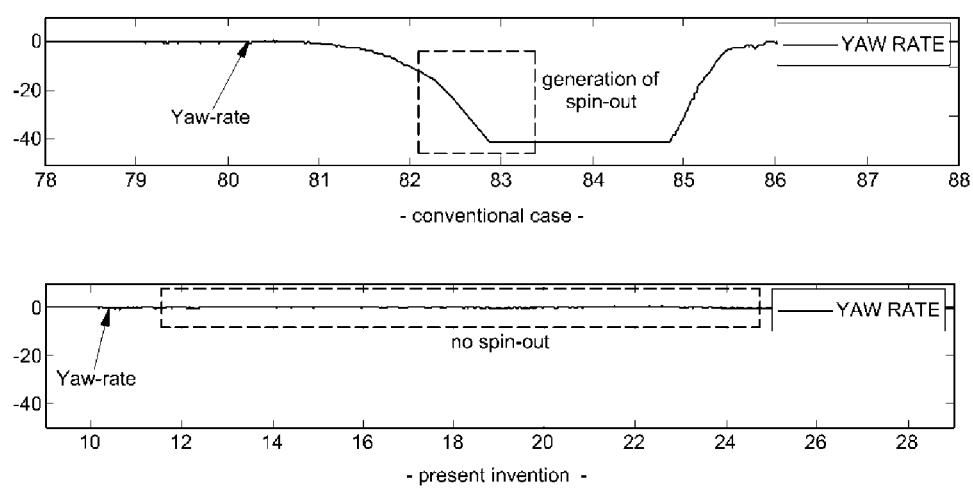

It could be seen that, due to faster locking of rear wheels than front wheels, the conventional regenerative braking shows problems in that wheel slip and reverse rolling of wheels shown in FIG. 7A, or wheel spinning shown in FIG. 7B occurs, resulting in degradation of braking stability, whereas the regenerative braking according to an exemplary embodiment of the present invention shows that there is no wheel slip or wheel-reverse rolling shown in FIG. 7A or the wheel spinning, leading to easy securing of braking stability.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. the exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rear wheel regenerative braking control system for a vehicle, the system comprising:
   a brake controller; a vehicle controller; a hydraulic controller; and a motor controller,
   wherein the brake controller is configured to determine and transmit an allowable rear-wheel regenerative braking performance value to the vehicle controller and to determine a target hydraulic braking performance value based on an actual rear-wheel regenerative braking performance value received from the vehicle controller and transmit the target hydraulic braking performance value to the hydraulic controller,
   wherein the vehicle controller is configured to determine a rear-wheel regenerative braking performance command value based on the allowable rear-wheel regenerative braking performance value received from the brake controller and transmit the rear-wheel regenerative braking performance command value to the motor controller and to transmit the actual rear-wheel regenerative braking performance value received from the motor controller to the brake controller, wherein the hydraulic controller is configured to apply a hydraulic braking force to a hydraulic brake based on the target hydraulic braking performance value received from the brake controller, wherein the motor controller is configured to control a motor to generate a rear-wheel regenerative braking operation according to the rear-wheel regenerative braking performance command value received from the vehicle controller, wherein the brake controller is configured to determine a wheel slip rate based on a detection signal from a wheel-speed detector and, when the wheel slip rate is maintained at a predetermined level for a predetermined time period, transmit a rear-wheel regenerative braking-interruption signal to the vehicle controller, wherein the vehicle controller is configured to reset the rear-wheel regenerative braking performance command value according to the rear-wheel regenerative braking-interruption signal to a value smaller than a current rear-wheel regenerative braking performance value and transmit the reset value to the motor controller, and wherein the motor controller controls a regenerative braking operation of the motor according to the actual rear-wheel regenerative braking performance value corresponding to the reset rear-wheel regenerative braking performance command value so that the rear-wheel regenerative braking operation is carried out thereby, preventing a rear wheel of the vehicle from being locked before a front wheel of the vehicle is locked or preventing spinning of the vehicle from occurring due to a locking of the rear wheel of the vehicle, wherein when the rear wheel is locked, a rotation of the rear wheel is stopped and when the front wheel is locked, a rotation of the front wheel is stopped, and wherein the rear-wheel regenerative braking performance command value according to the rear-wheel regenerative braking-interruption signal is reset, by the vehicle controller in response to the rear wheel regenerative braking interruption signal, to a value that decreases from the current rear-wheel regenerative braking performance value to zero.

2. The system according to claim 1, wherein the brake controller is configured to determine a wheel-speed difference between the front wheel and the rear wheel, and when the wheel-speed difference is determined to be a predetermined level or more, transmit the rear-wheel regenerative braking-interruption signal to the vehicle controller.

3. The system according to claim 1, wherein the brake controller is configured to receive a yaw rate-detection signal from a yaw rate detector, and when the yaw rate signal is determined to be a predetermined level or more, transmit a rear-wheel regenerative braking-interruption signal to the vehicle controller.

4. A rear wheel regenerative braking control method for a vehicle, the method comprising:

determining and transmitting, by a brake controller, an allowable rear-wheel regenerative braking performance value to a vehicle controller and determining a target hydraulic braking performance value based on an actual rear-wheel regenerative braking performance value received from the vehicle controller and transmitting the target hydraulic braking performance value to a hydraulic controller;

determining, by the vehicle controller, a rear-wheel regenerative braking performance command value based on the allowable rear-wheel regenerative braking performance value received from the brake controller and transmitting the rear-wheel regenerative braking performance command value to a motor controller, and transmitting the actual rear-wheel regenerative braking performance value received from the motor controller to the brake controller;

determining, by the hydraulic controller, a hydraulic braking force applied to a hydraulic brake based on the target hydraulic braking performance value received from the brake controller; and controlling, by the motor controller, a motor to generate a rear-wheel regenerative braking operation according to the rear-wheel regenerative braking performance command value received from the vehicle controller, wherein the method further includes steps of:

by the brake controller, determining a wheel slip rate based on a detection signal from a wheel-speed detector and; when the wheel slip rate is maintained at a predetermined level for a time period, transmitting a rear-wheel regenerative braking-interruption signal to the vehicle controller; and by the vehicle controller, resetting a rear-wheel regenerative braking performance command value according to the rear-wheel regenerative braking-interruption signal to a value smaller than a current rear-wheel regenerative braking performance value; and transmitting the reset value to the motor controller, wherein the motor controller controls a regenerative braking operation of the motor according to the actual rear-wheel regenerative braking performance value corresponding to the reset rear-wheel regenerative braking performance command value so that the rear-wheel regenerative braking operation is carried out thereby, preventing a rear wheel of the vehicle from being locked before a front wheel of the vehicle is locked or preventing spinning of the vehicle from occurring due to a locking of the rear wheel of the vehicle, wherein when the rear wheel is locked, a rotation of the rear wheel is stopped and when the front wheel is locked, a rotation of the front wheel is stopped, and wherein the rear-wheel regenerative braking performance command value according to the rear-wheel regenerative braking-interruption signal is reset, by the vehicle controller in response to the rear wheel regenerative braking interruption signal, to a value that decreases from the current rear-wheel regenerative braking performance value to zero.

5. The method according to claim 4, wherein the brake controller is configured to determine a wheel-speed difference between the front wheel and the rear wheel, and when the wheel-speed difference is determined to be a predetermined level or more, transmit a rear-wheel regenerative braking-interruption signal to the vehicle controller.

6. The method according to claim 4, wherein the brake controller is configured to receive a yaw rate-detection signal from a yaw rate detector, and when the yaw rate signal is determined to be a predetermined level or more, transmit the rear-wheel regenerative braking-interruption signal to the vehicle controller.

7. The method according to claim 4, wherein the motor controller is configured to control the regenerative braking operation of the motor according to the actual rear-wheel regenerative braking performance value corresponding to the reset rear-wheel regenerative braking performance command value, and at a same time, transmit the actual rear-wheel regenerative braking performance value corresponding to the rear-wheel regenerative braking performance command value to the brake controller.

8. The method according to claim 7, wherein, when the brake controller receives the actual rear-wheel regenerative braking performance value to correspond to the reset rear-wheel regenerative braking performance command value, the brake controller is configured to control a hydraulic braking performance value to increase by an amount by which the actual rear-wheel regenerative braking performance value is reduced.

9. A rear wheel regenerative braking control method for a vehicle, the method comprising:
- determining and transmitting, by a brake controller, an allowable rear-wheel regenerative braking performance value to a vehicle controller and determining a target hydraulic braking performance value based on an actual rear-wheel regenerative braking performance value received from the vehicle controller and transmitting the target hydraulic braking performance value to a hydraulic controller;
- after the determining and transmitting, by the brake controller, the allowable rear-wheel regenerative braking performance value, determining, by the vehicle controller, a rear-wheel regenerative braking performance command value based on the allowable rear-wheel regenerative braking performance value received from the brake controller and transmitting the rear-wheel regenerative braking performance command value to a motor controller, and transmitting the actual rear-wheel regenerative braking performance value received from the motor controller to the brake controller;
- after the determining, by the vehicle controller, the rear-wheel regenerative braking performance command value, determining, by the hydraulic controller, a hydraulic braking force applied to a hydraulic brake based on the target hydraulic braking performance value received from the brake controller; and
- after the determining, by the hydraulic controller, the hydraulic braking force, controlling, by the motor controller, a motor to generate a rear-wheel regenerative braking operation according to the rear-wheel regenerative braking performance command value received from the vehicle controller, wherein the method further includes steps of:
- determining, by the brake controller, a wheel slip rate based on a detection signal from a wheel-speed detector; and
- when the wheel slip rate is maintained at a predetermined level for a time period, transmitting a rear-wheel regenerative braking-interruption signal to the vehicle controller; and
- resetting, by the brake controller, the rear-wheel regenerative braking performance command value according to the rear-wheel regenerative braking-interruption signal to a value smaller than a current rear-wheel regenerative braking performance value; and
- transmitting the reset value to the motor controller,
- wherein the motor controller controls a regenerative braking operation of the motor according to the actual rear-wheel regenerative braking performance value corresponding to the reset rear-wheel regenerative braking performance command value so that the rear-wheel regenerative braking operation is carried out thereby preventing a rear wheel of the vehicle from being locked before a front wheel of the vehicle is locked or preventing spinning of the vehicle from occurring due to a locking of the rear wheel of the vehicle,
- wherein when the rear wheel is locked, a rotation of the rear wheel is stopped and when the front wheel is locked, a rotation of the front wheel is stopped, and
- wherein the rear-wheel regenerative braking performance command value according to the rear-wheel regenerative braking-interruption signal is reset, by the vehicle controller in response to the rear wheel regenerative braking interruption signal, to a value that decreases from the current rear-wheel regenerative braking performance value to zero.

* * * * *